United States Patent Office 3,755,375
Patented Aug. 28, 1973

3,755,375
PROCESS FOR STABILIZING α-AZIDO CARBONYL COMPOUNDS
Hans Schubel, Troisdorf, Germany, assignor to Dynamit Nobel Aktiengesellschaft, Troisdorf, Germany
No Drawing. Filed Apr. 7, 1969, Ser. No. 815,516
Claims priority, application Germany, Apr. 10, 1968,
P 17 68 176.4
Int. Cl. C07d *109/00*
U.S. Cl. 260—349     12 Claims

ABSTRACT OF THE DISCLOSURE

Process for stabilizing α-azido carbonyl compounds comprising adding a metal chelate former in an amount of 0.01 to 5 wt. percent to the α-azido carbonyl compound to be stabilized.

The invention also includes the novel stabilized α-axido carbonyl compounds.

---

This invention relates to a process for stabilizing α-azido carbonyl compounds. More particularly this invention relates to a process for stabilizing α-azido carbonyl compounds against decomposition by heavy metal-ions and the resultant stabilized products.

It is well known that organo azido compounds evidence considerably instability and in particular undergo decomposition on being heated. This decomposition takes place to a slightly lesser degree, already at room temperature which gives rise to difficulties in connection with the storage of these compounds. As is known, the decomposition of organo azido compounds is catalyzed by acid agents, such as mineral acids (J. H. Boyer and F. C. Canter, Chem. Reviews, 54, 26 (1954). Because of lack of storage stability of these compounds and further because of the danger of spontaneous decomposition at higher temperatures, the industrial processing and application thereof is made appreciably more difficult. In connection with the processing of technical azido compounds, these disadvantages occur to an oven greater degree, because of the impurities contained therein which act to catalyze the decomposition. It has therefore been necessary heretofore to subject the azido compounds to an expensive purification prior to using the same.

It has now surprisingly been found that organo α-azido compounds can be stabilized even in the presence of impurities, by adding metal chelate former ot the α-azido carbonyl compound to be stabilized.

In order to achieve a satisfactory stabilization there should be added to the α-azido carbonyl compound the metal chelate former in an amount of at least 0.01 wt. percent. Although the upper limit for the addition of the stabilizer is not critical, amounts of more than 5 wt. percent are not economical. The preferred amount of stabilizer lies between 0.01 and 1 wt. percent.

One aspect of the invention lies in the process of stabilizing α-azido carbonyl compounds. Another aspect comprises the resultant stabilized compounds.

As organo α-azido carbonyl compound to be stabilized in accordance with the invention there are intended compounds which carry an azido group in α-position to a carbonyl group. The carbonyl group can be part of a carboxyl- or carboxylic acid derivative group or the carbonyl group of an aldehyde or a ketone. The compounds to be stabilized in accordance with the invention are aliphatic α-azido carboxylic acids or aliphatic α-azido carboxylic acids substituted with cyclo aliphatic, aromatic or heterocyclic groups and include carboxylic acid anhydrides, esters, aldehydes and ketones, such as for instance α-azido phenyl acetic acid, and the like.

The compounds which have been found to be effective as stabilizers in accordance with the invention are substances which form with metal ions cyclic compounds, so-called chelates in which the ring closure takes place by coordination with a single electron pair of the stabilizer compound. The capability to form chelates belongs particularly to oxygen- and nitrogen compounds having one or more solitary electron pairs. There have been found to be particularly suitable for this purpose the carboxylic acids containing nitrogen such as amino carboxylic acids, imino carboxylic acids, and nitrilo carboxylic acids, such as glycocoll, ethylenediaminetetraacetic acid, nitrilotriacetic acid and salts and esters thereof, as well as carboxylic acids containing hydroxyl groups, such as lactic acid, glycolic acid, hydracrylic acid, tartaric acid and citric acid and salts and esters thereof, ketocarboxylic acids, such as glyoxylic acid, levulinic acid and pyroracemic acid and salts thereof, ketocarboxylic acid esters, such as acetoacetic esters, and diketones, such as acetylacetone, or its dioxime and acetonylacetone, phenols, such as hydroquinone and pyrocatechol, phenol carboxylic acids, such as salicylic acid and gallic acid, and heterocyclic compounds, such as 8-hydroxyquinoline and o-phenanthroline.

The metal chelate former is introduced into and mixed as homogeneously as possible, with the α-azido carbonyl compounds to be stabilized. This can be done by mixing solutions of both components and subsequently isolating the stabilized α-azido carbonyl compound in accordance with the known methods from its solution. An alternative method is the spraying of the powdery azido compounds with a solution of the metal chelate former.

The following examples are given in order to illustrate the invention, the same are, however, not to be construed as limiting the invention in any way.

The examples establish that impure α-azido phenyl acetic acid, particularly the acid having a content of heavy metals undergoes rapid thermal decomposition and that the rate of decomposition of pure α-azido phenyl acetic acid is also quite rapid on exposure to heat.

When a stabilizing agent, in accordance with the invention, is added, the rate of decomposition of the impure α-azidophenylacetic acid is reduced to such an extent that it is still appreciably below the rate of decomposition of the pure α-azidophenylacetic acid.

COMPARISON TESTS

Example 1

Purified α-azidophenylacetic acid (200 mg.) was heated to 120° C. in diethylphthalate (2 ml.) as solvent. After 90 minutes, the compound, under evolvement of gas, was decomposed mainly to benzaldehyde. The gaseous decomposition products were trapped in a buret in a pneumatic trough, collected and measured.

Example 2

Impure α-azidophenylacetic acid (200 mg.) having a content of 10 p.p.m. iron, was treated in accordance with the procedure of Example 1. The decomposition of the compound under these conditions was completed after 12 minutes and 22 seconds had elapsed.

PROCESS IN ACCORDANCE WITH THE INVENTION

Example 3

Impure α-azidophenylacetic acid (200 mg.) having an iron content of 10 p.p.m. in solution in diethylphthalate (2 ml.) was treated with 0.5 wt. percent ethylenediaminetetracetic acid, referred to the α-azidophenylacetic acid, and the resulting mixture then heated to 120° C. The decomposition of the stabilized α-azidophenylacetic acid, however, was not completed even after approximately 7 hours had elapsed.

Example 4

Example 3 was repeated, however, in this instance 0.5 wt. percent of nitrilotriacetic acid was added as stabilizer. Decomposition took place only after approximately 10 hours had passed.

Example 5

The procedure as set out in Example 3 was repeated again using 0.05 wt. percent ethylenediaminetetraacetic acid as stabilizer. The decomposition of the α-azidophenylacetic acid was complete after 6.5 hours.

Example 6

The procedure described in Example 3 was repeated but using 0.05 wt. percent of nitrilotriacetic acid as stabilizer. The decomposition took under the aforesaid conditions approximately 9 hours.

Example 7

In this instance Example 3 was repeated but using 1 wt. percent of ethylenediaminetetraacetic acid as stabilizer. The time for decomposition amounted to approximately 9 hours.

Example 8

The procedure set out in Example 3 was repeated but with 1 wt. percent nitrilotriacetic acid as stabilizer. The time for decomposition to be effected amounted to approximately 13 hours.

Example 9

Example 3 was again repeated but with 0.5 wt. percent of citric acid as stabilizer. The decomposition of the α-azido-phenylacetic acid was completed only after approximately 8 hours had elapsed.

Example 10

Example 3 was repeated but using 0.5 wt. percent of tartaric acid as stabilizer. The decomposition was ended after approximately 13 hours.

Example 11

The procedure of Example 3 was repeated, however, with 0.05 wt. percent of citric acid as stabilizer. Decomposition was complete after approximately 7 hours.

Example 12

In this instance Example 3 was repeated, but using 0.05 wt. percent of tartaric acid as stabilizer. The decomposition was complete after approximately 10 hours.

Example 13

Example 3 was again repeated but with 1 wt. percent of tartaric acid as stabilizer. The time for decomposition to be effected amounted to approximately 24 hours.

What is claimed is:

1. Process for stabilizing an α-azido carbonyl compound subject to decomposition when in contact with a heavy metal, said carbonyl compound selected from the group consisting of alkyl α-azido carboxylic acids, phenyl substituted aliphatic α-azido carboxylic acids, cyclo alkyl substituted alkyl α-azido carboxylic acids, anhydrides of said carboxylic acids, alkyl esters of said carboxylic acids, alkyl α-azido aldehydes and dialkyl α-azido ketones, which process comprises admixing said α-azido carbonyl compound with 0.01 to 5 weight percent of a metal chelate forming stabilizer compound having an oxygen or nitrogen substituent containing at least one unbonded pair of electrons selected from the group consisting of amino carboxylic acids, imino carboxylic acids, nitrile carboxylic acids, hydroxycarboxylic acids, keto carboxylic acids, diketones, phenol carboxylic acids, dihydric phenols, 8-hydroxyquinoline, o-phenanthroline, salts and esters thereof.

2. Process according to claim 1 which comprises adding said metal chelate former in an amount of 0.01 to 1 wt. percent.

3. Process according to claim 1 wherein said metal chelate former is a member selected from the group consisting of amino carboxylic acid, imino carboxylic acids and nitrilo carboxylic acids.

4. Process according to claim 1 wherein said α-azido carbonyl compound is α-azidophenylacetic acid.

5. Process as claimed in claim 4 wherein said stabilizer compound is a member selected from the group consisting of glycocoll, ethylene diamine tetra acetic acid, nitrilo triacetic acid, lactic acid, glycolic acid, hydracrylic acid, tartaric acid, citric acid, glyoxylic acid, levulinic acid, pyroracemic acid, aceto acetic acid, acetylacetone, dioxime, hydroquinone, pyrocatechol, salicylic acid, gallic acid, γ-hydroxyquinoline and γ-phenanthroline.

6. Process according to claim 4 wherein said stabilizer is ethylenediaminetetraacetic acid.

7. Process according to claim 4 wherein said stabilizer is nitriloacetic acid.

8. Process according to claim 4 wherein said stabilizer is citric acid.

9. Process according to claim 4 wherein said stabilizer is tartaric acid.

10. An admixture of an α-azido carbonyl compound selected from the group consisting of alkyl α-azido carboxylic acids, cyclo alkyl substituted α-azido carboxylic acids, phenyl substituted α-azido carboxylic acids, a salt of said acid, an alkyl ester of said acid, an anhydride of said acid, alkyl α-azido aldehydes, and dialkyl α-azido ketones, which α-azido compound is subject to decomposition upon contact with a heavy metal, and a stabilizing amount of 0.01 to 5 weight percent, based upon the weight of said α-azido compound, of a metal chelate forming oxygen or nitrogen containing compound having at least one free electron pair selected from the group consisting of amino carboxylic acids, imino carboxylic acids, nitrilo carboxylic acids, hdyroxy carboxylic acids, ketocarboxylic acids, diketones, dihydric phenols, phenol carboxylic acids, 8-hydroxyquinoline, o-phenanthroline, esters thereof and salts thereof.

11. The mixture claimed in claim 10, including 0.01 to 1 weight percent of a stabilizer selected from the group consisting of glycocoll, ethylene diamine tetra acetic acid, nitrilotriacetic acid, lactic acid, glycolic acid, hydracrylic acid, tartaric acid, citric acid, glyoxylic acid, levulinic acid, pyroracemic acid, acetoacetic acid, acetylacetone, acetylacetone dioxime, hydroquinone, pyrocatechol, salicylic acid, gallic acid, γ-hydroxy quinoline and O-phenanthroline.

12. A stabilized alkyl α-azido carboxylic acid according to claim 1, wherein said azido compound is α-azido phenyl acetic acid.

References Cited
UNITED STATES PATENTS

| | | | |
|---|---|---|---|
| 3,032,581 | 5/1962 | Leonard | 260—349 |
| 3,105,082 | 9/1963 | Walborsky et al. | 260—349 |
| 3,470,233 | 9/1969 | Bohn et al. | 260—349 |

OTHER REFERENCES

Boyer et al., J. Org. Chem., vol. 21, pp. 1030–1 (1956).

JOHN M. FORD, Primary Examiner

UNITED STATES PATENT OFFICE
CERTIFICATE OF CORRECTION

Patent No. 3,755,375      Dated Aug. 28, 1973

Inventor(s) Hans Schubel

It is certified that error appears in the above-identified patent and that said Letters Patent are hereby corrected as shown below:

Col. 1, line 17 change "axido to -- azido --

Col. 1, line 40 change "oven" to -- even --

Col. 1, line 47 change "ot" to -- to --

Col. 2, line 17 change "esters" to -- ester --

Col. 3, line 61 change "aliphatic" to -- alkyl --

Col. 4, line 32 after "substituted" insert -- alkyl --

Col. 4, line 33 after "substituted" insert -- alkyl --

Signed and sealed this 26th day of March 1974.

(SEAL)
Attest:

EDWARD M. FLETCHER, JR.
Attesting Officer

C. MARSHALL DANN
Commissioner of Patents